(12) United States Patent
Haller et al.

(10) Patent No.: US 7,245,220 B2
(45) Date of Patent: Jul. 17, 2007

(54) RADIO FREQUENCY IDENTIFICATION (RFID) CONTROLLER

(75) Inventors: Stephan Haller, Karlsruhe (DE); Uwe Kubach, Waldbronn (DE)

(73) Assignee: SAP Aktiengesellschaft, Walldorf (DE)

( * ) Notice: Subject to any disclaimer, the term of this patent is extended or adjusted under 35 U.S.C. 154(b) by 151 days.

(21) Appl. No.: 10/854,766

(22) Filed: May 27, 2004

(65) Prior Publication Data

US 2005/0264401 A1 Dec. 1, 2005

(51) Int. Cl.
G08B 13/14 (2006.01)
(52) U.S. Cl. ............ 340/572.1; 340/10.1; 340/10.4; 340/568.1; 342/42; 342/44
(58) Field of Classification Search .......... 340/572.1, 340/10.1, 10.2, 568.1, 10.4, 10.3, 572.7, 340/10.42, 5.8, 572.4, 505, 825; 342/42, 342/44
See application file for complete search history.

(56) References Cited

U.S. PATENT DOCUMENTS

| 5,822,714 | A | * | 10/1998 | Cato | ............ 702/108 |
| 6,084,530 | A | * | 7/2000 | Pidwerbetsky et al. | .. 340/10.32 |
| 6,195,006 | B1 | * | 2/2001 | Bowers et al. | ............ 340/572.1 |
| 6,346,884 | B1 | * | 2/2002 | Uozumi et al. | ............ 340/572.1 |
| 6,446,208 | B1 | * | 9/2002 | Gujar et al. | ................ 713/185 |
| 6,617,962 | B1 | * | 9/2003 | Horwitz et al. | ............ 340/10.4 |
| 2004/0024768 | A1 | | 2/2004 | Haller | |

FOREIGN PATENT DOCUMENTS

| WO | WO 03/061060 | * | 7/2003 |
| WO | WO 03/061366 | | 7/2003 |

OTHER PUBLICATIONS

Oat Systems & MIT Auto-ID Center, "Technical Manual: The Savant—Version 0.1 (Alpha)," Feb. 1, 2002, [Online], [retrieved from the Internet Jul. 13, 2005: www.autoidlabs.com/whitepapers/MIT-AUTOID-TM-003.pdf], pp. 1-46.

* cited by examiner

Primary Examiner—Daniel Wu
Assistant Examiner—Daniel Previl
(74) Attorney, Agent, or Firm—Fish & Richardson P.C.

(57) ABSTRACT

A radio frequency identification (RFID) controller within an RFID system includes an RFID interrogator interface configured to receive signals from an RFID interrogator. The RFID interrogator receives data from RFID tags. The RFID controller also includes a user interface configured to receive a selection of data processing units and an arrangement of data processing units. The RFID controller further includes a controller core configured to process the signals received from the RFID interrogator interface and configured to modify processing of the signals from RFID interrogator based on the selection and the arrangement of the data processing units.

17 Claims, 7 Drawing Sheets

RADIO FREQUENCY IDENTIFICATION (RFID) CONTROLLER

TECHNICAL FIELD

The following description relates to radio frequency identification (RFID) and, in particular, RFID systems.

BACKGROUND

A radio frequency identification (RFID) system identifies unique items using an interrogator and an RFID tag. Typically, the interrogator communicates with the RFID tag that is attached to an item. The interrogator, also known as a reader, communicates with the RFID tag through radio waves and passes the information read from the RFID tag in digital form to a computer system. The RFID tag is typically a microchip that stores the digital information. The microchip is attached to an antenna that receives signals from and sends signals to the interrogator. The RFID tag includes a unique serial number and may include other information, such as a customer account number.

RFID tags can be active tags, passive tags or semi-passive tags. Active tags include a power source that powers the microchip's circuitry and transmits a signal to the interrogator. Passive tags do not include a power source. Passive tags draw the power required for the circuitry and the transmission of information from the electromagnetic field generated by the interrogator. Semi-passive tags are similar to active tags; however, the power source is used to run the microchip's circuitry but not to communicate with the interrogator. Some semi-passive tags are inactive until they are activated by a signal from the interrogator, which conserves life of its power source.

SUMMARY

In one aspect, the invention is a radio frequency identification (RFID) controller within an RFID system. The RFID controller includes an RFID interrogator interface configured to receive signals from an RFID interrogator. The RFID interrogator receives data from RFID tags. The RFID controller also includes a user interface configured to receive a selection of data processing units and an arrangement of data processing units. The RFID controller further includes a controller core configured to process the signals received from the RFID interrogator interface and configured to modify processing of the signals from RFID interrogator based on the selection and the arrangement of the data processing units.

In another aspect, the invention is a method of processing radio frequency identification (RFID) data. The method includes receiving a configuration input from a user. The configuration input includes an arrangement of data processing units to process RFID data. The method also includes receiving the RFID data from an RFID interrogator and processing the RFID data based on the configuration input.

In a further aspect, the invention is a RFID controller within an RFID system. The controller includes an RFID interrogator interface configured to receive signals from an RFID interrogator. The RFID interrogator receives data from RFID tags. The RFID controller also includes a first data set indicating a selection of data processing units, a second data set indicating an arrangement of the data processing units and a user interface configured to receive the first data set and the second data set. The RFID controller further includes a controller core configured to process the signals received from the RFID interrogator interface and configured to modify processing of the signals from RFID interrogator based on the first data set and the second data set.

The aspects above may have one or more of the following features. For example, the controller may include an administrative services component to store configuration files based on the arrangement and the selection of the data processing units. In other features, the user interface may be a graphical user interface (GUI) connected to the controller core.

In still other features, the data processing units may include a data enricher configured to read data from the RFID tags and add additional data to an event. In another example, the data processing units also may include a writer configured to write data to the RFID tags. In further examples, the data processing units may include a buffer configured to store events for transmission to an application. The data processing units may include an aggregator configured to collect several events into one signal event. The data processing units may include a filter configured to remove specific events according to a rule.

In still further features, processing the RFID data based on the configuration input may include changing the processing of RFID data from an existing process to a new process based on the configuration input. Other features include validating the configuration input. Validating may include validating connections between the data processing units.

The aspects above may have one or more of the following advantages. For scalability reasons, data received from the RFID interrogators is generally processed at the lowest level. However, an RFID system having hundreds of interrogators and a few RFID controllers is expensive to manage as a distributed system. In this disclosure, the RFID controller provides a flexible mechanism for easy adaptation and configuration thereby lowering the costs for managing and maintaining the whole RFID system. The RFID controller provides a tool to users to configure their RFID system by allowing users to select the required data processing units and arranging the data processing units to meet user requirements. Thus, the RFID controller is flexible to be easily adapted to any scenario, thereby eliminating the need to develop new controller hardware and/or software for every new RFID scenario.

Other features, objects and advantages will become apparent from the following detailed description when read in connection with the accompanying drawings.

DESCRIPTION OF DRAWINGS

Like reference symbols in the various drawings indicate like elements.

DETAILED DESCRIPTION

Figure 1:
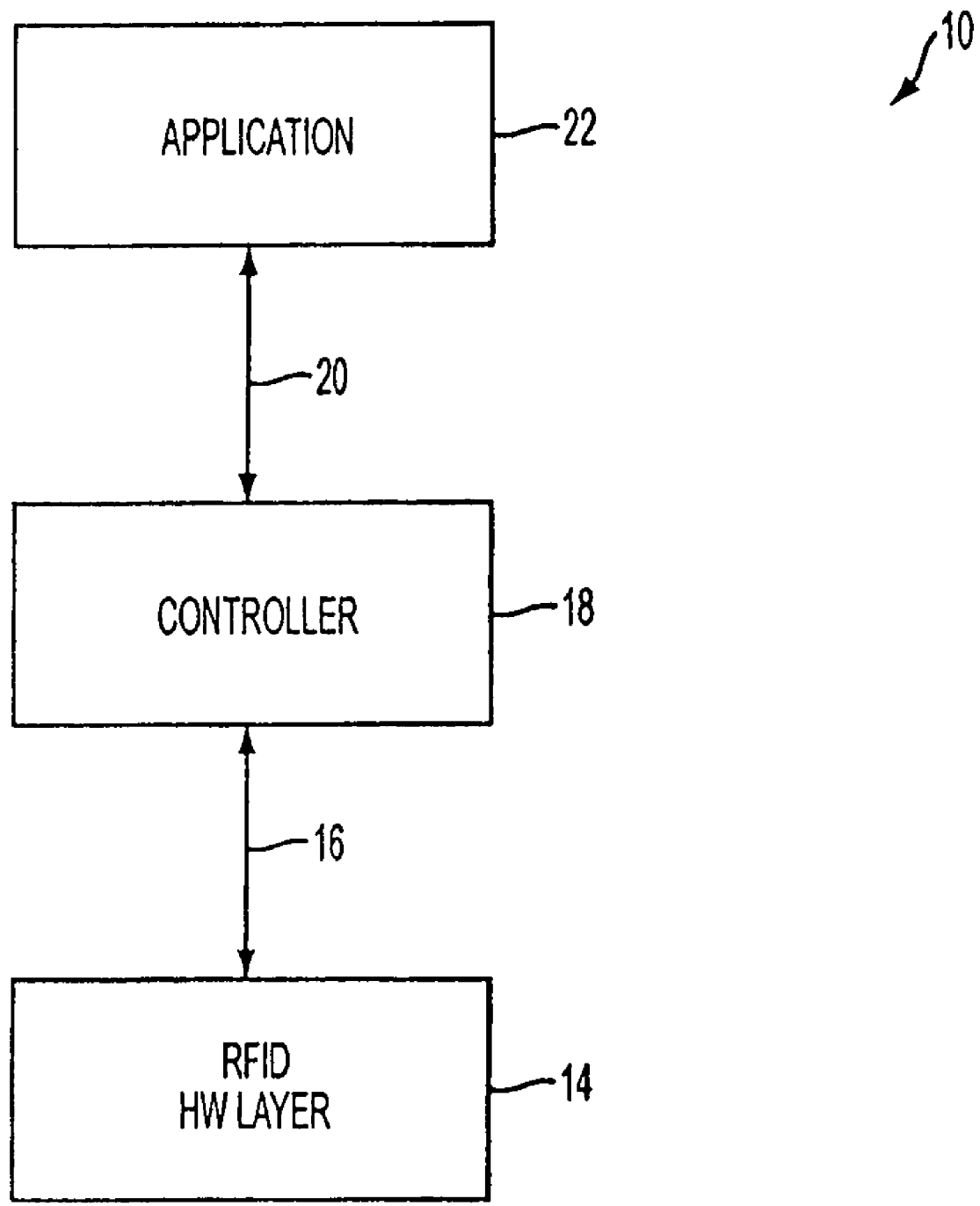
FIG. 1 is a block diagram of a radio frequency identification (RFID) system.
Figure 2:
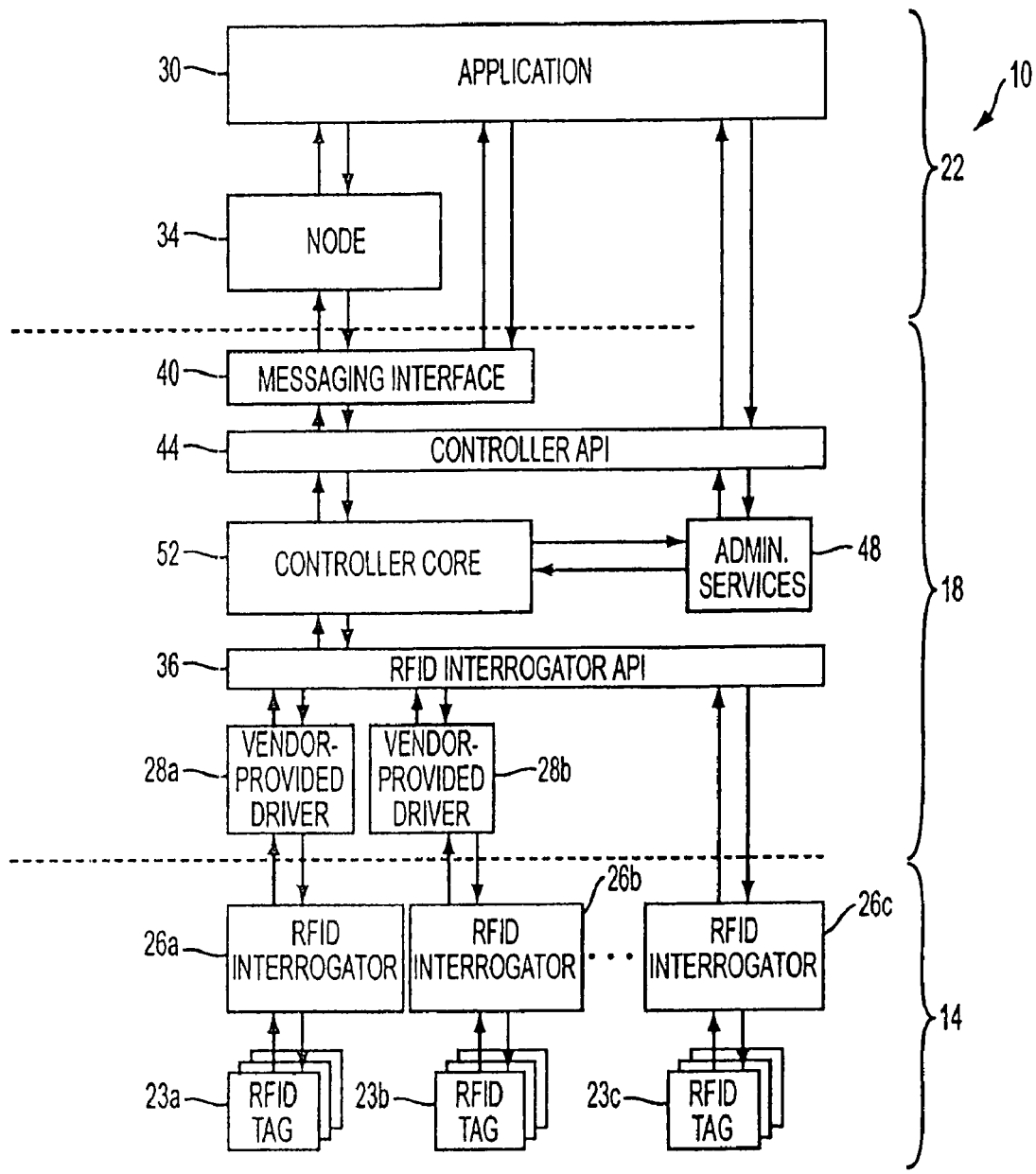
FIG. 2 is a detail block diagram of the RFID system of FIG. 1.

Referring to FIGS. 1 and 2, a radio frequency identification (RFID) system 10 includes an RFID hardware layer 14, an RFID controller component 18, and an application component 22. The RFID hardware layer 14 and the RFID controller component 18 are connected by a bus 16 that uses a protocol such as a transmission control protocol/Internet protocol (TCP/IP), a hypertext transfer protocol (HTTP), a publish/subscribe protocol, RS-232C, a user datagram protocol (UDP), or other suitable protocol for communication between computing components. The RFID controller component 18 and the application component 22 are connected by a bus 20 that uses a protocol such as a TCP/IP, a hypertext transfer protocol (HTTP), a publish/subscribe protocol or the like.

The controller component 18 processes information gathered by RFID hardware layer 14 and sends the processed information to the application component 22. For example, an elementary implementation includes an RFID hardware layer 14 recording data from the RFID tags attached to items in stock. The controller component 18 receives data from the RFID tags detected by the RFID hardware layer 14. The controller component 18 filters the data to remove false detections and aggregates the data to be sent in a series of batches to the application component 22. The application component 22, for example, a warehouse management application, uses the data detected by the RFID hardware layer 14 to update the inventory status in a warehouse.

In existing RFID systems, specialized software is written to control the operations of single RFID interrogators. Over time, as requirements change, the legacy RFID systems will require newer software or the older software will need modification every time new functionality is required in the legacy RFID system. For example, RFID systems will require software that performs additional functions from one scenario to another scenario, e.g., detecting and identifying RFID tags, reading additional data from the RFID tags, writing data to the RFID tags, filtering of data and events. Sometimes additional equipment is needed, such as lights or conveyer belts that need to be turned "on" or "off" depending on the RFID tags that were scanned.

As will be shown herein, unlike existing RFID systems, the controller component 18 of RFID system 10 can be configured to meet any required scenario so that data received from the RFID hardware layer 14 can be processed according to the required scenario requirements and sent to the application component 22. In one example, a user may choose from different types of data processing units and arrange these data processing units in a chain, for example, to meet the requirement of a scenario.

RFID Hardware Layer

The RFID hardware layer 14 includes groups of RFID tags (e.g., RFID tags 23a, RFID tags 23b and RFID tags 23c) and RFID interrogators (e.g., RFID interrogator 26a, RFID interrogator 26b and RFID interrogator 26c). Each group of RFID tags 23a–23c communicates with a corresponding RFID interrogator 26a–26c (e.g., RFID tags 23a communicate with RFID interrogator 26a; RFID tags 22b communicate with RFID interrogator 26b and RFID tags 23c communicate with RFID interrogator 26c) through radio frequency signals. For example, an RFID interrogator records an event when an RFID tag enters a radio field of the RFID interrogator or if the RFID tag leaves the radio field. In another example, RFID interrogator periodically or continuously determines what tags it detects. The software determines a difference between an old set of tags previously detected and a new set of tags presently detected and generates an event based on the difference. Each group of RFID tags 23a–23c may be passive tags, active tags or semi-passive tags or any combination of the three.

Application Component

Application component 22 includes an application 30 and a node 34. The application 30 may be any application that uses information from the RFID tags such as a business application. The application 30 may access controller component 18 through the node 34. Node 34 is responsible for managing the information coming from RFID controller 18 and other types of device controllers (not shown). For example, node 34 may be a node within an infrastructure for a business management system such as an Auto-ID Infrastructure (AII). The application component 22 may communicate with controller component 18 directly to provide a graphical user interface (GUI) (not shown) for monitoring the controller component 18 or to provide user instructions to configure the controller component 18.

Controller Component

Controller component 18 includes, vendor-provided drivers (vendor-provided driver 28a and vendor-provided driver 28b), an RFID interrogator application programming interface (API) 36, a messaging interface 40, a controller API 44, an administrative service module 48 and a controller core 52. The RFID controller component 18 is responsible for controlling the RFID interrogators 26a–26c.

Vendor-Provided Drivers

Some RFID interrogators 26a–26b have additional functionality beyond a basic functionality of reading/writing RFID tags and listening for RFID tags that require special drivers such as drivers 28a–28b in order for the controller component 18 to communicate with the RFID interrogator to access the additional functionality. Other RFID interrogators, such as RFID interrogators 26c, with the basic functionality, communicate directly with the RFID interrogator API 36. In other examples, each driver implements all the functionality of the interrogator API 36. In further examples, some RFID interrogators 26 support the interrogator API 36 natively (no drivers are required). In still other examples, RFID interrogators 26 may not support the API interrogator 36 directly. In these situations, the drivers map the API functions into proprietary, reader-specific commands.

RFID Interrogator API

The RFID interrogator API 36 is a low-level API that acts as an abstraction layer for RFID interrogators having basic read/write and listener functionality. The RFID interrogator API 36 performs several functions including identifying tags within the radio field, reading bytes from the RFID tag, writing bytes to the RFID tag, and connecting or disconnecting with RFID tags. Some RFID tags include a memory. The memory may be divided into pages. The interrogator API 36 maps the byte addresses into page addresses. For example, assuming 128 bytes per page, byte address "0" indicates a first byte on a first page and byte "130" indicates a third byte on a second page. The memory may be organized into structures other than pages. For example, the RFID interrogator API 36 may use a generic approach of having a single addressable memory space. As implemented, the interrogator API 36 translates between a proprietary structure and an API structure.

In addition, the RFID interrogator API 36 also offers a listening mechanism through a listener interface so that RFID tags 23 that appear or disappear from the field of the RFID interrogator 26 are reported. The RFID API interrogator 36 will start a listening mode process if listeners have been designated and an initialization command is issued from the controller component 18. The listening mode process will stop after a terminate command is issued by the controller component 18 or when the last listener is removed from the field.

Messaging Interface

The messaging interface 40 enables a service-oriented mode of communicating with the controller component 18. The messaging interface 40 is thus less RFID-specific than when accessing the controller API 44 directly. For example, commands to and data messages from the controller component 18 are sent as messages. The functions within the messaging interface 40 are identical to the functions offered in the controller API 44 and the message formats are based on a physical markup language (PML). Another format that may be implemented is a WLP (Wire-Line Protocol). The messaging interface 40 transforms the events received from the controller component 18 into either format using a transformation data processing function. The transformation can be changed by implementing a transformation class and configuring the device controller to use one transformation class or another transformation class.

The messaging interface 40 also includes a send buffer data processing function. The send buffer data processing function is used for offline situations and/or when a connection is lost. Events received by the messaging interface 40 from the controller component 18 may be temporarily buffered until a connection is established and then the events are sent.

In other example, a separate communication layer (not shown) within the messaging interface 40 may be used to transfer the messages between the application component 22 and the RFID controller component 18. Therefore, the actual communication protocol used to transfer the messages may be switched according to configuration settings. The communication protocol may include Transmission Control Protocol/Internet Protocol (TCP/IP) direct socket connection, HyperText Transfer Protocol (HTTP), or Java messaging service (JMS).

Controller API

The controller API 44 performs as a high-level programming interface between the controller component 18 and the application component 22. The controller API 44 may be, for example, a high-level Java-based programming interface.

Controller Core

The controller core 52 is responsible for the main operation of the RFID controller component 18. The controller core 52 communicates to one or more RFID interrogators 26a–26c through the interrogator API 36. Depending on its configuration, the controller core 52 can either listen to events coming from the interrogators 26a–26c, directly perform read/write operations on the RFID tags or do both listening and performing operations.

Figure 3:
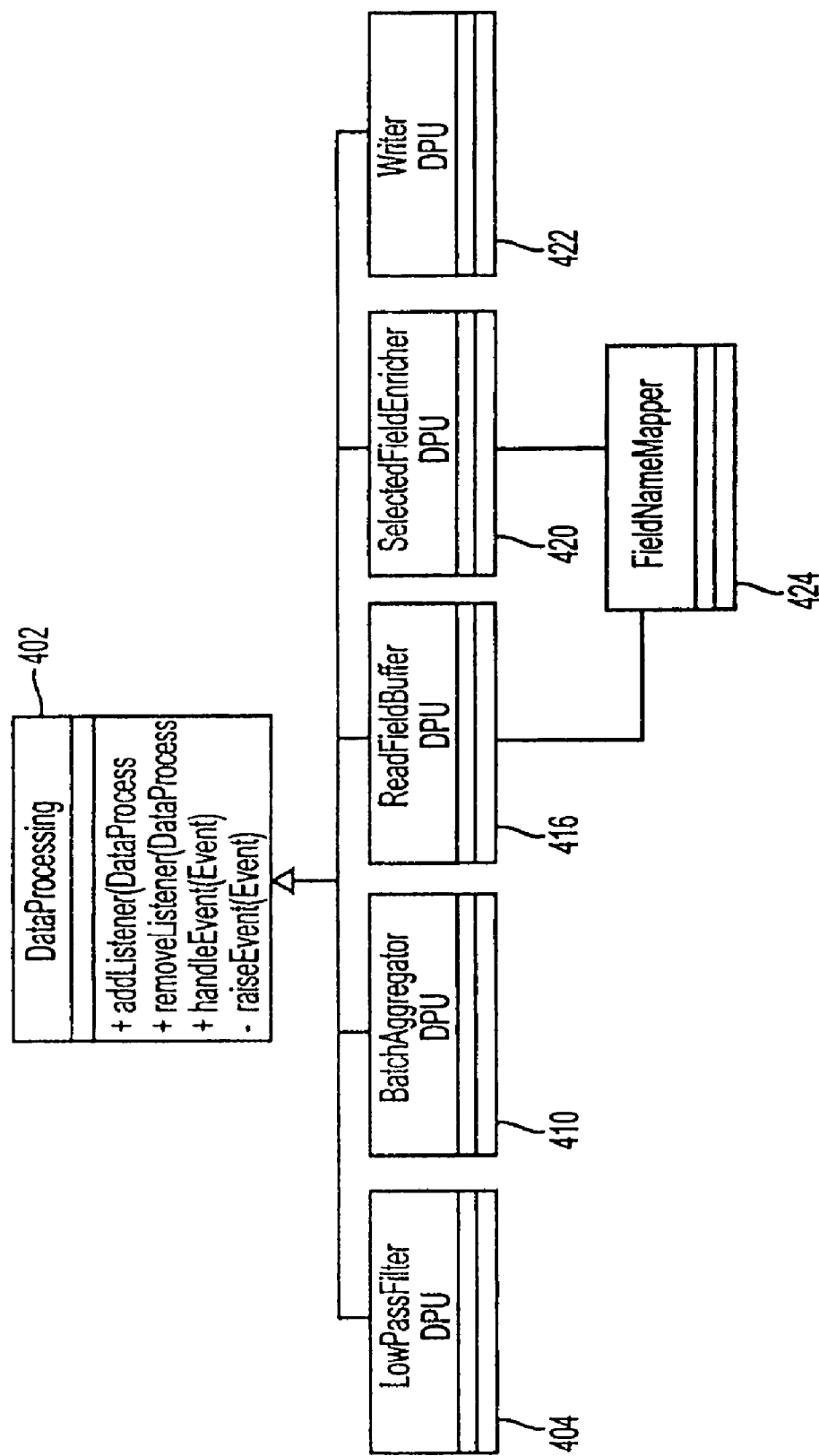
FIG. 3 is a class diagram for a data processor subcomponent.

Referring to FIG. 3, one of the main tasks of the controller core 52 is to process the data before it is sent through the messaging interface 40. The type of processing performed on the data depends on the scenario requirements. Therefore, the controller core 52 is implemented as a flexible framework of classes, called data processing units, that enhances the processing capabilities by adding specific data processing units that implement the required functionality.

A data processing subcomponent 402 includes subclasses such as a low pass filter data processing unit (DPU) 404, a batch aggregator DPU 410, a read field buffer DPU 416, a selected field enricher DPU 420 and a writer DPU 422. The data processing subcomponent 402 is an abstract class, i.e., there is no instance of this class running, but the subclasses (or DPUs) 404, 410, 416, 420, 422 run. FIG. 3 shows that the DPUs include all the methods/interfaces. From an external perspective, the DPUs can all be treated similarly and therefore be arranged in any chain desirable. For example, the DPUs may be used to add listeners, remove listeners, handle events, raise events at all registered listeners and may implement the listener interface from the interrogator API 36.

The DPUs 404, 410, 416, 420, 422 perform one or more of the following functions: reading of additional data from RFID tags through the interrogator API 36, writing additional data to RFID tags through interrogator API 36, filtering of events, aggregation of events and buffering of events.

Enrichers

Enrichers read additional data from the tags or possibly other sources and add this data to the data structure of the event. For example, a "Selected Field Enricher" data processing unit 420 reads the data from selected data fields of the RFID tag and adds this data to the event.

Writers

A writer DPU 422 writes data to or changes data on the RFID tags. In one exemplary implementation, writer DPU 422 may change a customer account number on an RFID tag by overwriting one customer number with another customer number.

Filters

Filters remove out certain events according to some criteria, e.g., the filters remove all events coming from RFID tags having a certain class. An example of a filter is a "Low Pass Filter" data processing unit 404, which buffers events by filtering out false or "disappeared" events. Another filter is a duplicate filter that processes and removes any duplicates, e.g., if several physical readers see the same tag at the same time, however logically this should be treated as one event since the physical readers logically belong to the same location (e.g., a specific dock door in a warehouse).

Buffers

Buffers store the events for later processing and/or keep an inventory of RFID tags currently in the field (i.e., radio signal range of the RFID interrogator). For example, a "Read Field Buffer" data processing unit 416 keeps a list of all RFID tags in the field. This includes tag user data if an enricher has read some additional data before the event was passed to the data processing subcomponent 402. Events received are forwarded unchanged. In another example, a "Send Buffer" data processing unit 520 (FIG. 5) is used in offline situations. Events received will be temporarily buffered until a connection is established, for example, with a host computer, and then the events are sent. As will be described below, "State Buffer" data processing unit 524 (FIG. 5) stores events to be used later.

Aggregators

Aggregators aggregate several events into a single event, e.g., for batching purposes. For example, a "Batch Aggregator" data processing unit 410 aggregates several events into a single event. The aggregation is done during a configurable time interval or up to a configurable maximum number of events, whichever comes first. If no events have been received during this interval, no event is forwarded.

The controller core 52 may handle requests from the application 30 regarding the operation of the controller component 18. The controller core 52 may also manage the RFID interrogators 26a–26c. For example, the controller core 52 may perform functions including instantiating and initializing one or more interrogators, registering the appropriate data processors as listeners for specific RFID interrogators and explicitly controlling the RFID interrogators.

The controller core 52 also includes a logging function that is used for debugging and controlling purposes. The controller core 52 also includes a field name resolution function to resolve logical field names to physical addresses on the RFID tag. For example, a "Field Name Mapper" function 424 maps logical field names to physical addresses on the RFID tag.

Figure 4:
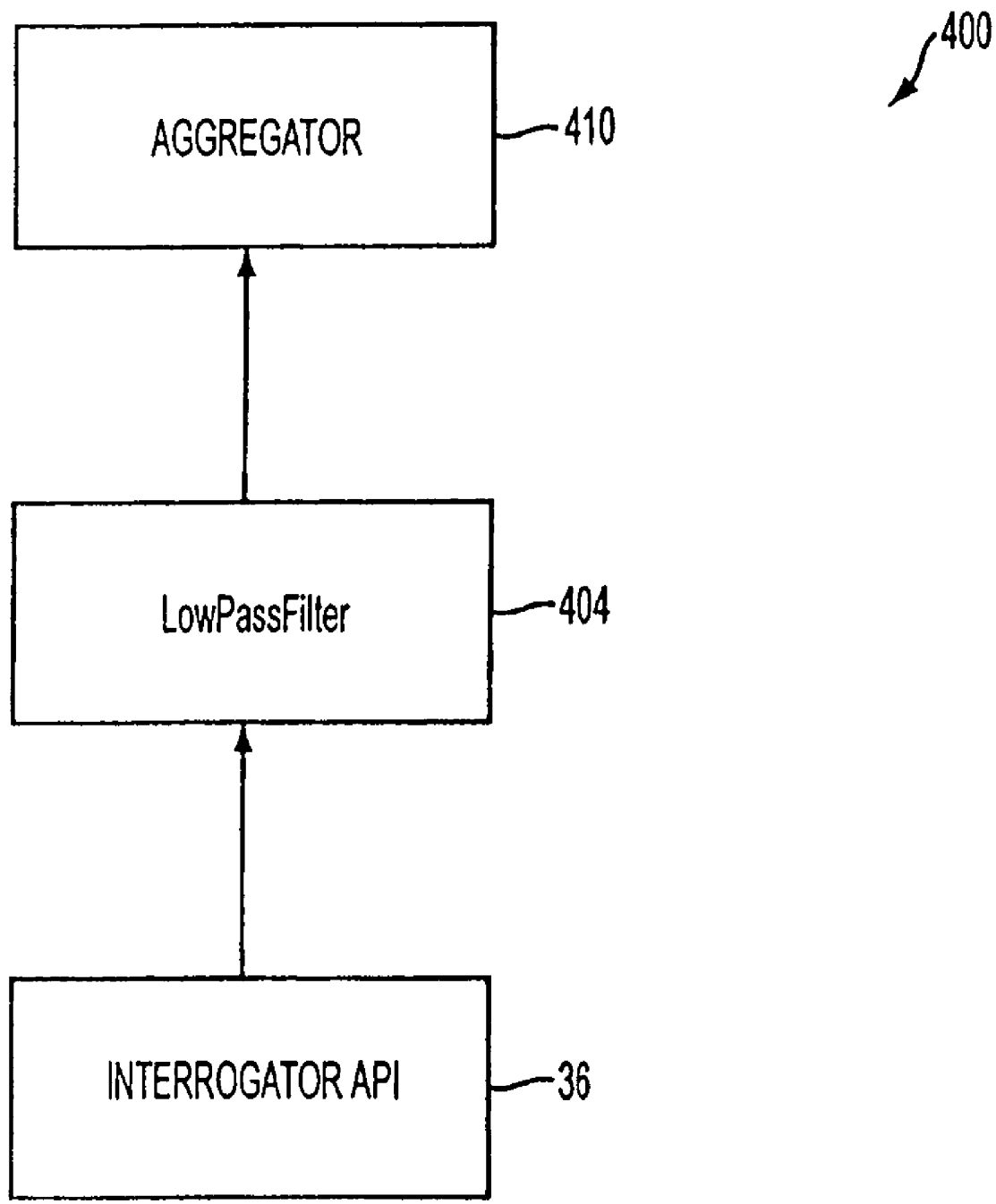
FIG. 4 is a block diagram of simple chain of data processing units.

Referring to FIG. 4, the data processing units may be selected and configured into a chain to meet a variety of different scenarios. For example, if lights need to be turned on when specific RFID tags are detected or a conveyor belt needs to be controlled, these scenarios can be accomplished by implementing a new data processing unit and linking it into a chain. For example, the data processing units can be configured in a simple chain 400 of data processing units.

As described above, the RFID interrogator API 36 may operate in a listening operation mode. In the listening operation mode, the events are passed through the chain 400 of data processing units. The events processed in chain 400 are different from the RFID events coming from the interrogator API 36. While the RFID events coming from the interrogator API 36 may contain just the ID's of the RFID tags identified, the events from chain 400 may contain additional tag data that was read or may even be an aggregation of events. If a data processing unit needs additional information from an RFID tag, it retrieves the appropriate data from the interrogator API 36. Each data processing unit represents a simple component implementing a special function. By combining these simple components into powerful chains, it is possible to build and support the functionality required by a scenario.

An RFID tag event is created when an RFID tag appears or disappears from the radio field. The RFID tags, and thus the associated events, are reported through the interrogator API 36. The low-pass filter 404 discards any false events. The aggregator 410 aggregates the single events into one complex event so that higher-level systems (e.g., application component 22) are not flooded with events.

Figure 5:
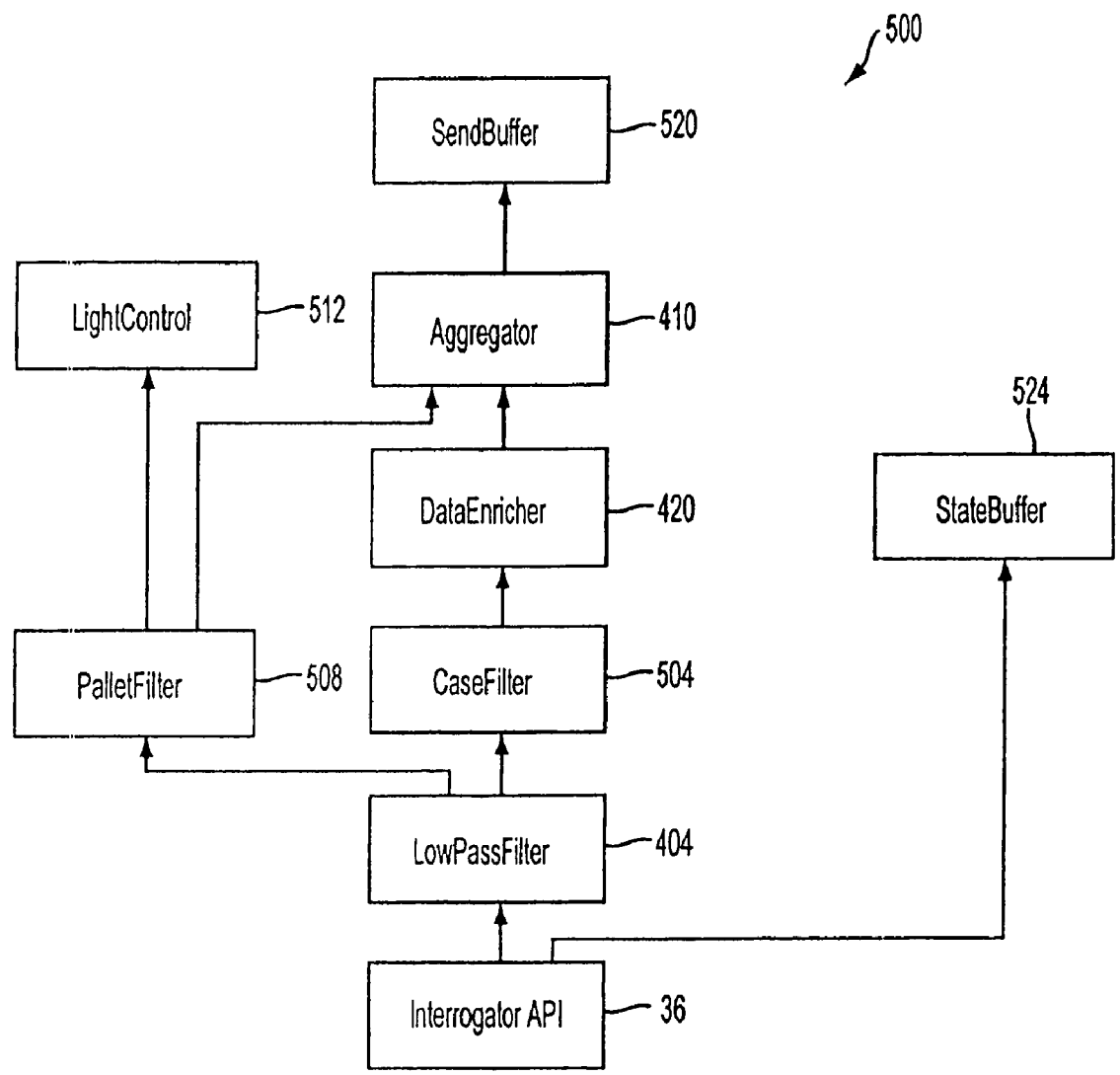
FIG. 5 is a block diagram of a complex chain of data processing units.

Referring to FIG. 5, the data processing units may be added and reconfigured from a simple chain 400 to a complex chain 500 of data processing units to add additional processing and/or a new processing sequence to an existing system. For example, complex chain 500 includes data processing units such as a case filter 504, a pallet filter 508, a light control 512, a state buffer 524 and a send buffer 520. The complex chain 500 records events from RFID tags attached to supplies packaged in cases and RFID tags attached to pallets that hold cases.

The case filter 504 sorts the events coming from cases and the pallet filter 508 sorts the events coming from pallets. The light control 512 activates a light after a case or pallet is received. The send buffer 520 stores the messages to be sent. The state buffer 524 stores all RFID tags currently in the radio field of the RFID interrogator for auditing and reporting purposes.

For events coming from cases, additional data is read from the RFID tag using the enricher 420. When a pallet is in the field of an RFID interrogator, the light control 512 turns on a light to notify workers of a pallet. The events for both the cases and the pallets are aggregated by the aggregator 410 to build a single event that includes the pallet and all the cases that were put into the pallet. A single pallet-building event is then placed into the send buffer data processing unit 520 that sends the event message to the application component 22 (e.g., a business system). The event message remains buffered in the send buffer until it has been successfully sent to the application 30.

Thus, the RFID controller 18 provides a flexible mechanism for easy adaptation and configuration thereby lowering the costs for managing and maintaining the whole RFID system 10. The RFID controller 18 provides a tool to users to configure their RFID system 10 by allowing users to select the required data processing units and arranging the data processing units to meet user requirements. Thus, the RFID controller 18 is flexible to be easily adapted to any scenario, thereby eliminating the need to develop new controller hardware and/or software for every new RFID scenario.

Administrative Services

Referring back to FIG. 2, the administrative services module 48 includes a "Status information" function that replies to status "pings" or lists descriptions of which data processor chains are instantiated and the provision of connection points so that other applications can add their own listeners to the data processors.

The administrative services module 48 also includes a "heartbeat" function that sends out a heartbeat to registered clients every n seconds. If n is set to zero, or if there are no registered clients, no message will be sent. The administrative services module 48 further includes a "restart" function that restarts the controller component 18. The administrative services module 48 also includes a "configuration management" function that sets or retrieves individual configuration parameters as well as saves and restores whole configurations, and includes a "Logging" function that is used for debugging and controlling purposes.

Figure 6:
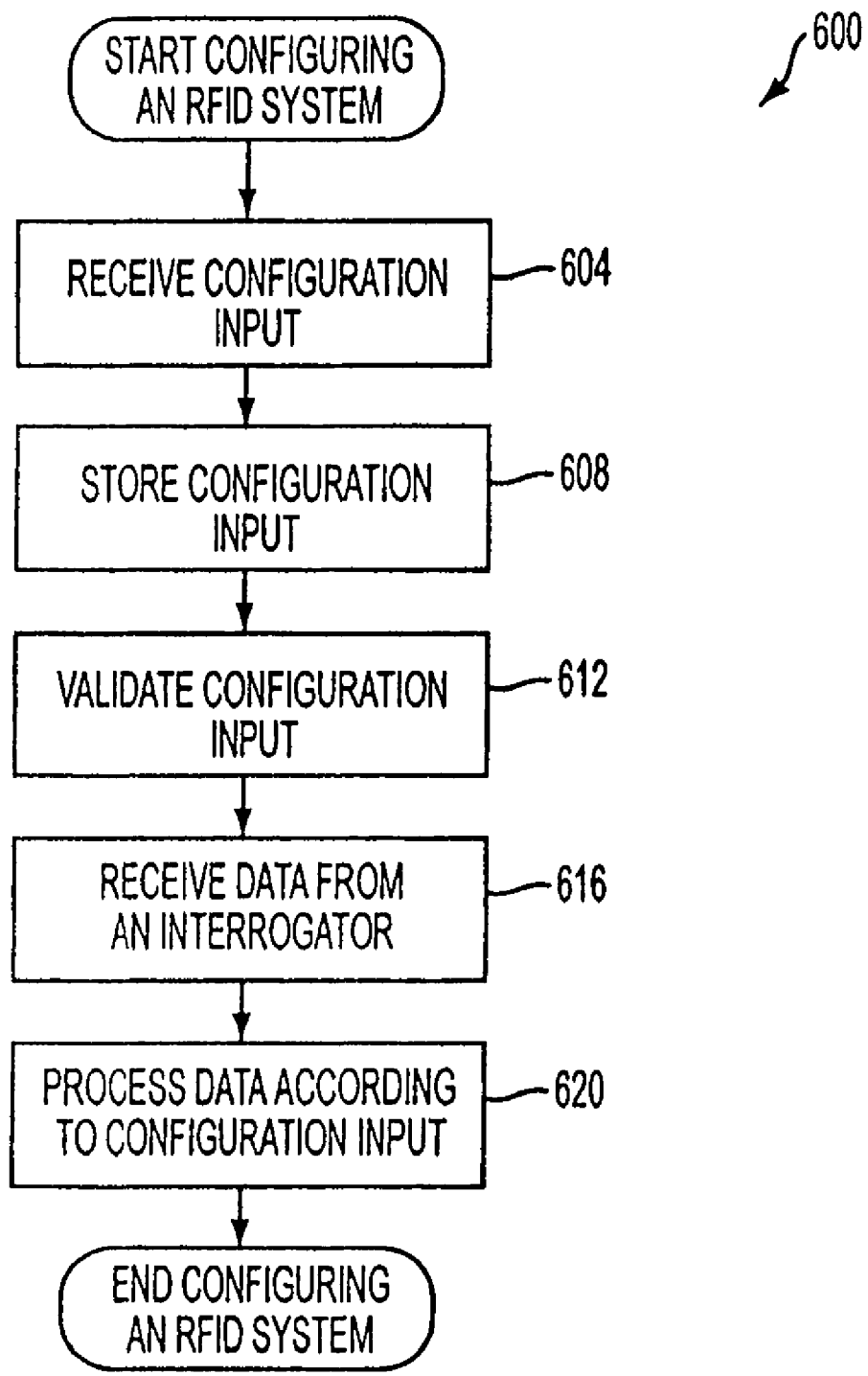
FIG. 6 is a flowchart for an exemplary process for configuring the RFID system of FIG. 1.

Referring to FIG. 6, an exemplary process for configuring an RFID system is shown as a process 600. Process 600 receives a configuration input (604). The configuration input includes data processing units arranged in a chain. The configuration input can be entered through a GUI (not shown) located at the application 30 or at the controller core 52. The application 30 may also generate the configuration input based on a set of instructions stored within the application 30. For example, the configuration input is sent when a new device is detected by the application 30. The configuration input may also be inputted directly through the administrative services module 48.

Process 600 stores the configuration input as a file in the administrative services module 48 (608). Process 600 validates the configuration input (612). The administrative services module 48 ensures that the connections between the data processing units are valid. Process 600 receives data from the RFID interrogator (616). The data are sent to the data processing subcomponent 402 for processing. Process 600 processes the data received from the RFID interrogator using the configuration input (620).

Figure 7:
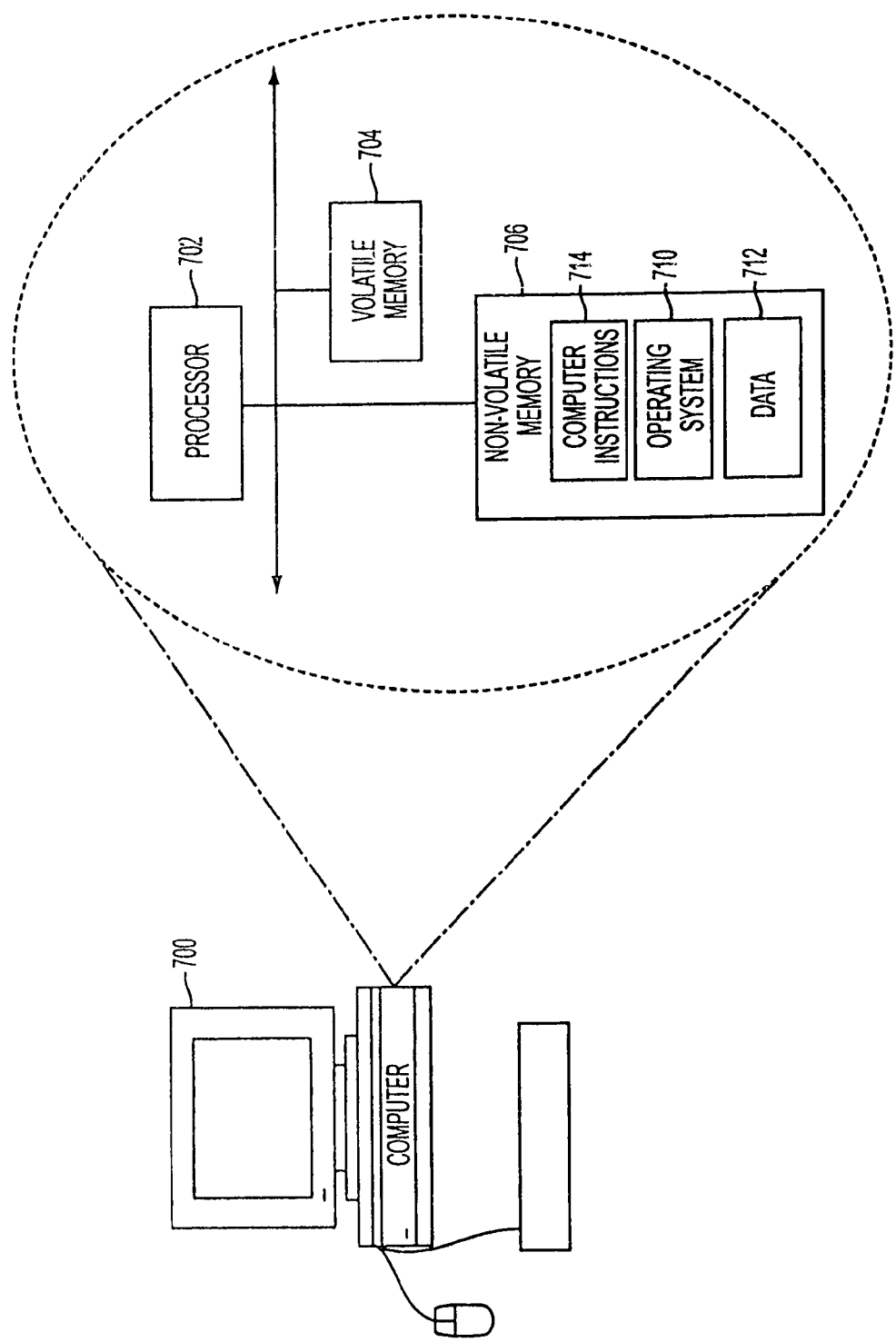
FIG. 7 is a block diagram of a computer system on which the process of FIG. 6 may be implemented.

FIG. 7 shows a computer 700 for implementing process 600. Computer 700 includes a processor 702, a volatile memory 704, and a non-volatile memory 706 (e.g., hard disk). Non-volatile memory 706 stores an operating system 710, data 712 used by process 600, and computer instructions 714 which are executed by processor 702 out of volatile memory 704 to perform process 600.

Process 600 is not limited to use with the hardware and software of FIG. 7; it may find applicability in any computing or processing environment and with any type of machine that is capable of running a computer program. Process 600 may be implemented in hardware, software, or a combination of the two. For example, process 600 may be implemented in a circuit that includes one, or a combination of, a processor, a memory, programmable logic and logic gates.

Process 600 may be implemented in computer programs executed on programmable computers/machines that each includes a processor, a storage medium or other article of manufacture that is readable by the processor including volatile and non-volatile memory and/or storage elements, at least one input device, and one or more output devices. Program code may be applied to data entered using an input device to perform process 600 and to generate output information.

Each such program may be implemented in a high level procedural or object-oriented programming language to communicate with a computer system. However, the programs also may be implemented in assembly or machine language. The language may be a compiled or an interpreted language. Each computer program may be stored on a storage medium or device e.g., CD-ROM, hard disk, or magnetic diskette that is readable by a general or special purpose programmable computer for configuring and operating the computer when the storage medium or device is read by the computer to perform process 600. Process 600 may also be implemented as one or more machine-readable storage media, configured with a computer program(s), where upon execution, instructions in the computer program(s) cause a computer to operate in accordance with process 600.

Process 600 is not limited to the specific implementations described herein. For example, process 600 is not limited to the specific processing order of FIG. 6. Rather, the blocks of FIG. 6 may be reordered as necessary to achieve alternate processing sequences.

In some examples, controller component 18 may be run as a stand-alone component on a fixed, possibly embedded, personal computer (PC). Controller component 18 is configured to run autonomously whenever the controller component 18 is started, i.e., installing it as a service (on Windows NT/2000) or to run it as a daemon (Linux).

In other examples, controller component 18 may run on a mobile device as part of an application with a user interface. In still other examples, controller component 18 functionality may be embedded within an RFID interrogator 26*a*–26*c*.

In other examples, controller component 18 is used in an online operation as well as in an offline operation. While the RFID controller component 18 usually runs in a connected state, reporting RFID events and data to an associated node 34, it is also possible to configure the RFID controller component 18 to deal with intermittent or no connectivity with a host computer.

The above text describes novel apparatus and techniques for controlling RFID systems. It is evident that those skilled in the art may now make numerous modifications and uses of and departures from specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims. Other implementations are within the scope of the following claims:

What is claimed is:

1. A device comprising:
    a graphical user interface (GUI) connected to a controller core, the GUI configured to receive a configuration input selecting a plurality of data processing units, each of the plurality of data processing units implementing a filter function, an aggregator function, a buffer function, an enricher function, a writer function, or a controller function on event data received from an RFID interrogator antenna;
    an RFID hardware layer configured to:
        receive event data at the RFID interrogator antenna, the event data recorded at a single RFID interrogator antenna from a plurality of RFID tags, and
        send the event data from the RFID interrogator antenna to the controller component;
    an application component; and
    a controller core configured to:
        link the plurality of data processing units in a chain of data processing units based upon the configuration input,
        to validate the chain of data processing units,
        to receive the event data from the RFID hardware layer,
        to process the event data from the RFID interrogator in the chain of data processing units, and
        to transmit the processed event data to the application component.

2. The device of claim 1, further comprising: an administrative services component to store configuration files based on the chain of data processing units.

3. The device of claim 1, wherein the enricher function is configured to read event data from the plurality of RFID tags and add additional data to the event data.

4. The device of claim 1, wherein the writer function is configured to write data to the plurality of RFID tags.

5. The device of claim 1, wherein the buffer function is configured to store the event data for transmission to an application.

6. The device of claim 1, wherein the aggregator function is configured to collect a plurality of event data into one signal event.

7. The device of claim 1, wherein the filter function is configured to remove specific event data according to a rule.

8. The device of claim 1, further comprising:
    a controller interface connecting the controller core to the application component, the controller core being configured to provide a high-level programming interface for data processed from the RFID interrogator through the controller interface to the application component.

9. The device of a claim 8,
    wherein the GUI is connected to the application component, and
    wherein the GUI allows a user to generate the configuration input via the selection of the plurality of data processing units.

10. A method comprising:
    receiving a configuration input from a user via graphical user interface (GUI) connected to a controller core, the configuration input selecting a plurality of data processing units within the controller core, each of the plurality of data processing units implementing a filter function, an aggregator function, a buffer function, an enncher function, a writer function, or a controller function on event data received from an RFID interrogator antenna;
    linking, in the controller core, the plurality of data processing units in a chain of data processing units based upon the configuration input;
    validating, in the controller core, the chain of data processing units;
    receiving event data at the RFID interrogator antenna, the event data recorded at a single RFID interrogator antenna from a plurality of RFID tags;
    sending the event data from the RFID interrogator antenna to the controller core;

receiving, at the controller core, the event data from the RFID interrogator antenna;

processing, in the controller core, the event data from the RFID interrogator in the chain of processing units; and transmitting the processed event data to an application component.

11. The method of claim 10, wherein processing the event data comprises changing the processing of event data from an existing process to a new process based on the configuration input.

12. The method of claim 10, wherein validating the chain of data processing units comprises validating connections between the data processing units.

13. The method of claim 10, wherein a second, data processing unit processes the event data after a first data processing unit processes the event data.

14. An apparatus comprising a storage medium having instructions stored thereon, the instructions comprising:
- a first data set for receiving a configuration input from a user, via a graphical user interface (GUI) connected to a controller core, the configuration input selecting a plurality of data processing units within the controller core, each of the plurality of data processing units implementing a filter function, an aggregator function, a buffer function, an enricher function, a writer function, or a controller function on event data received from an RFID interrogator antenna;
- a second data set for linking, in the controller core, the plurality of data processing units in a chain of data processing units based upon the configuration input;
- a third data set for validating, in the controller core, the chain of data processing units;
- a fourth data set for receiving event data at the RFID interrogator antenna, the event data recorded at a single RFID interrogator antenna from a plurality of RFID tags;
- a fifth data set for sending the event data from the RFID interrogator antenna to the controller core;
- a sixth data set for receiving, at the controller core, the event data from the RFID interrogator antenna;
- a seventh data set for processing, in the controller core, the event data from the RFID interrogator in the chain of data processing units; and
- an eighth data set for transmitting the processed event data to an application component.

15. The apparatus of claim 14, further comprising an administrative services data set for storing configuration files based on at least the first data set and the second data set.

16. A device comprising:
a user interface configured to receive a configuration input selecting a plurality of data processing units, the plurality of data processing units implementing at least three of a filter function, an aggregator function, a buffer function, an enricher function, a writer function, and a controller function;

an RFID hardware layer configured to record event data from a plurality of RFID tags;

an application component; and a controller core configured to link the plurality of data processing units in a chain of data processing units based upon the configuration input, to validate the chain of data processing units, to receive the event data from the RFID hardware layer, to process the event data in the chain of data processing units, and to transmit the processed event data to the application component.

17. A method comprising:

receiving a first configuration input from a user via a graphical user interface (GUI) connected to a controller core, the configuration input selecting at least first and second data processing units within the controller core, the data processing units implementing a function from the following group of functions: a filter function, an aggregator function, a buffer function, an enricher function, a writer function, or a controller function on event data received from an RFID interrogator antenna;

linking, with the controller core, the first and second data processing units in a first chain of data processing units based upon the first configuration input;

validating, in the controller core, the first chain of data processing units;

receiving event data at the RFID interrogator antenna, the event data recorded at a single RFID interrogator antenna from a plurality of RFID tags;

sending the event data from the RFID interrogator antenna to the controller core;

processing, in the controller core, the event data from the RFID interrogator in the first and second data processing units according to the first chain of processing units;

transmitting the processed event data to an application component;

receiving a second configuration input from the user, via the GUI, the second configuration input selecting third and fourth data processing units;

linking, in the controller core, the third and fourth data processing units in a second chain of data processing units based upon the second configuration input;

validating, in the controller core, the second chain of data processing units;

processing, in the controller core, the event data from the RFID interrogator using the third and fourth data processing units according to the second chain of processing units; and transmitting the processed event data to the application component.

* * * * *